Dec. 22, 1942.   M. K. GOLDSTEIN   2,305,614
PHASE METER
Filed July 18, 1941
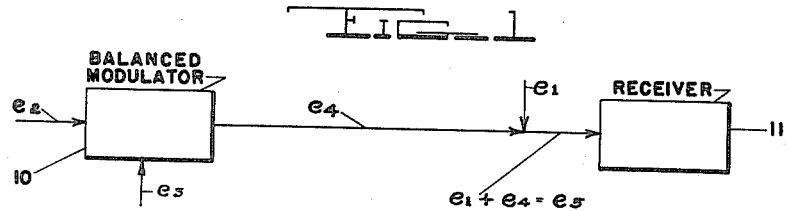
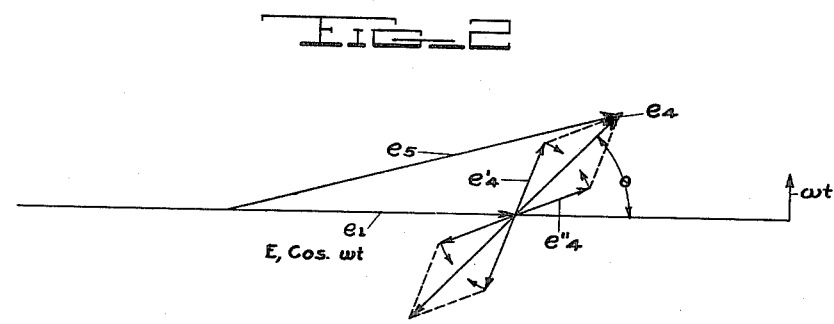
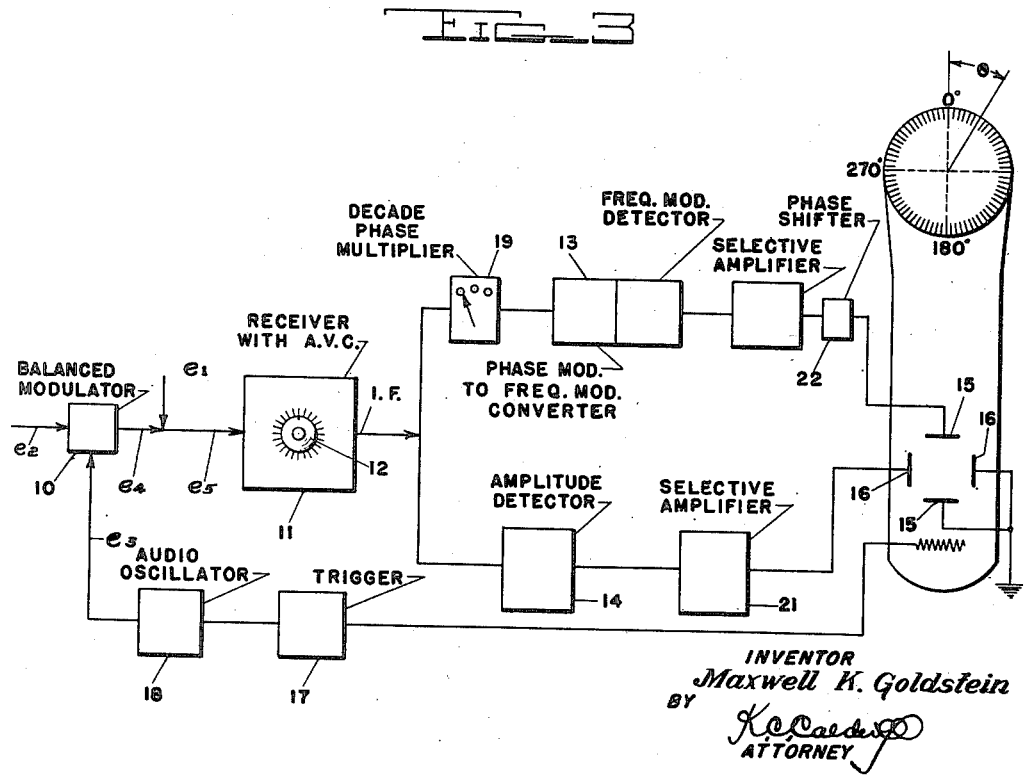
INVENTOR
*Maxwell K. Goldstein*
BY
ATTORNEY Patented Dec. 22, 1942

2,305,614

UNITED STATES PATENT OFFICE 2,305,614

PHASE METER

Maxwell K. Goldstein, Washington, D. C.

Application July 18, 1941, Serial No. 402,998

16 Claims. (Cl. 172—245)

(Granted under the act of March 3, 1883, as amended April 30, 1928; 370 O. G. 757)

This invention relates to a direct indicating phase meter.

There has long been a need in the art for some means of directly and accurately determining the phase difference between two radio frequency voltages.

It is an object of this invention to provide a means for supplying that need. It is another object of this invention to provide such a means which will automatically and directly indicate phase difference in a visual manner. It is a further object of this invention to provide such a device in a form which can be frequency selective and which can be tuned by the manipulation of a single control and can thus be operated with ease by inexperienced personnel. It is a still further object of this invention to provide a phase meter which is independent of the relative amplitudes of the voltages, the phase difference of which is to be determined.

Other objects will become apparent from a consideration of the following disclosure when taken with the accompanying drawing in which:

Fig. 1 is a block diagrammatic showing of a circuit illustrating the principles underlying the invention;

Fig. 2 is a vector diagram illustrating the voltage relations obtaining in the circuit of Fig. 1, and Fig. 3 is a block diagrammatic illustration of a complete phase meter embodying the invention and including means for indicating phase relationship.

Referring now to Figs. 1 and 2, the two R. F. voltages, the phase relationship of which is to be determined, are indicated by $e_1$ and $e_2$. The invention contemplates the modulation of one of the voltages, for example, $e_2$, by a low frequency voltage $e_3$ in a balanced modulator 10. The resulting product of this modulation is the voltage $e_4$ which consists of the side bands $e'_4$ and $e''_4$. The theoretical explanation of this operation is as follows:

Let $e_1 = E_1 \cos \omega t$
Let $e_2 = E_2 \cos (\omega t + \theta)$
Let $e_3 = E_3 \cos pt =$ modulating low frequency voltage
Then $e_4 = e_2 . e_3 = E_2 E_3 \cos (\omega t + \theta) \cos pt$
$= E_4/2 [\cos (\omega t + \theta + pt) + \cos (\omega t + \theta - pt)]$
$= e'_4 + e''_4$ Note that, as stated above, $e_4$ consists of the side bands $e'_4$ and $e''_4$. The positions of the side band vectors depend directly upon $\theta$; consequently $e_5$ equals $e_1 + e_4$ as shown in Fig. 2; i. e., If $\theta = 0°$
$e_5 = E_1 \cos \omega t + E_4/2 [\cos (\omega + p)t + \cos (\omega - p)t]$
$= E_1 \cos \omega t + E_4 \cos \omega t \cdot \cos pt$
$= E_1 [1 + E_4/E_1 \cos pt] \cos \omega t =$ pure amplitude modulation where $E_4/E_1$ is the depth of modulation.

If $\theta$ is 90°
$e_5 = E_1 \cos \omega t + E_4/2 [\cos (\pi/2 + (\omega+p)t) + \cos (\pi/2 + (\omega-p)t]$
$= E_1 \cos \omega t - E_4/2 [\sin (\omega+p)t + \sin (\omega-p)t]$
$= E_1 [\cos \omega t - (E_4/E_1 \cos pt) \sin \omega t] =$ phase modulation For $\theta = 90°$ it is seen that $e_4$ adds in quadrature with $e_1$ and thus produces a pronounced phase shift (proportional to $E_4/E_1 \cos pt$) and a negligible amplitude change (if $E_4/E >> 1/2$)—see Figure 2.

For other values of $\theta$, the amplitude modulation is proportional to $$E_4/E_1 \cos pt \cos \theta$$

while the phase modulation is proportional to $$E_4/E_1 \cos pt \sin \theta$$

As shown in Fig. 3 the voltage $e_5$ is fed into a receiver 11 which may have automatic volume control, the receiver being tuned by the single signal tuning dial 12 which is the only control necessary to the operation of the phate meter.

After leaving the receiver, the I. F. voltage is sent through two detectors, one indicated at 13 being responsive to phase modulation and the other indicated at 14 being responsive to amplitude modulation. The phase detector will give an output proportional to sine $\theta$ while the output of the amplitude detector will be proportional to cosine $\theta$. The detectors should be adjusted so that their gain and output levels give the same factor of proportionality. These outputs may then be applied to the orthogonal deflecting plates of a cathode ray oscillograph, the output of phase detector 13 being applied to vertical deflecting plates 15 while the output of amplitude detector 14 is applied to horizontal deflecting plates 16.

The result will be a line traced along the diameter of the tube face. The spot tracing out the line will oscillate at a frequency of $$p/2\pi$$

and the line position from the fixed reference point will vary with $\theta$, the phase difference between the radio frequency voltages $e_1$ and $e_2$. Unique lead-lag phase indication is obtained by blocking the cathode ray beam during one-half of the $$p/2\pi$$

cycle. This is accomplished by a triggering mechanism 17 actuated by the audio oscillator 18 which supplies the voltage $e_3$. Phase detection can be accomplished in a known manner by passing the phase modulated signal through a limiter and a frequency multiplier, thus converting phase modulation to frequency modulation, then heterodyning and passing the result through a discriminator network. When great accuracy is required or small phase angles are to be measured, it is possible to increase the accuracy of measurement by increasing in steps of ten times the phase difference between the R. F. voltages to be measured. This can conveniently be done by using a phase multiplier 19 in the phase detection channel prior to detection. The phase multiplier may consist of an appropriate frequency multiplier combined with frequency heterodyning. The decade multiplier can be arranged to be switched in or out of the circuit at will.

Selective amplifiers 20 and 21 responsive only to frequency $$\frac{p}{2\pi}$$

may be employed to prevent the signal modulation or noise from obscuring the measurement. A phase shifter 22 may be employed to compensate for any undesirable phase difference of the $$\frac{p}{2\pi}$$

frequency in the two detection channels.

It should be understood that the practice of the invention is not limited to the embodiments illustrated and described but is circumscribed only by the scope and limitations of the appended claims.

The invention described herein may be manufactured and/or used by or for the Government of the United States of America for governmental purposes without the payment of any royalties thereon or therefor.

I claim:

1. Means for measuring the phase difference between two radio frequency voltages, comprising means modulating one of said voltages with a low frequency voltage, means superimposing said modulated voltage upon the other of said radio frequency voltages, means amplifying the resultant of said superimposed voltages, means deriving from said amplified voltage a pair of voltages having the frequency of said modulating voltage, the amplitude of one of said derived voltages being a function of the sine of the angle of phase difference between said radio frequency voltages, the amplitude of the other being a function of the cosine of said angle, a cathode ray oscillograph, means applying one of said derived voltages to one pair of the deflecting plates of said oscillograph, and means applying the other to the remaining pair of said deflecting plates.

2. Means for measuring the phase difference between two radio frequency voltages, comprising means modulating one of said voltages with a low frequency voltage, means superimposing said modulated voltage upon the other of said radio frequency voltages, means amplifying the resultant of said superimposed voltages, means submitting said amplified voltage to both phase and amplitude detection, a cathode ray oscillograph, means impressing the output of said phase detecting means upon one pair of the deflection plates of said oscillograph, and means impressing the output of said amplitude detecting means upon the remaining pair of deflection plates of said oscillograph.

3. Means for measuring the phase difference between two radio frequency voltages, comprising means modulating one of said voltages with a low frequency voltage, means superimposing said modulated voltage upon the other of said radio frequency voltages, means amplifying the result of said superimposed voltages, and means deriving from said amplified voltage a voltage having the frequency of said modulating voltage and the amplitude of which is a function of the sine of the angle of phase difference between said radio frequency voltages.

4. Means for measuring the phase difference between two radio frequency voltages, comprising means modulating one of said voltages with a low frequency voltage, means superimposing said modulated voltage upon the other of said radio frequency voltages, means amplifying the result of said superimposed voltages, and means deriving from said amplified voltage a voltage having the frequency of said modulating voltage and the amplitude of which is a function of the cosine of the angle of phase difference between said radio frequency voltages.

5. Means for measuring the phase difference between two radio frequency voltages, comprising means modulating one of said voltages with a low frequency voltage, means superimposing said modulated voltage upon the other of said radio frequency voltages, means deriving from said amplified voltage a voltage having the frequency of said modulating voltage and the amplitude of which is a function of the sine of the angle of phase difference between said radio frequency voltages, and means deriving from the said amplified voltage a voltage having the frequency of said modulating voltage and the amplitude of which is a function of the cosine of the angle of phase difference between said radio frequency voltages.

6. Means for measuring the phase difference between two radio frequency voltages, comprising means for amplitude modulating one of said voltages at a low frequency, means superimposing on the resulting voltage the other of said voltages, means submitting the resultant of said superimposed voltages to phase detection, means submitting said resultant to amplitude detection, and means indicating the vectorial sum of the outputs of said detecting means.

7. Means for measuring the phase difference between two radio frequency voltages, comprising means superimposing one of said two voltages upon the other by means of a low frequency modulating voltage, means amplifying the result of said superimposed voltages, means submitting said resultant voltage to separate phase and amplitude detection, and means indicating the vectorial sum of the outputs of said detecting means.

8. Means for measuring the phase difference between two radio frequency voltages, comprising means for amplitude modulating one of said voltages with a low frequency voltage, means superimposing on the resulting voltage the other of said radio frequency voltages, means amplifying the resultant of said superimposed voltages, means submitting said amplified voltage to phase detection, and means for indicating said detected output in a manner permitting direct correlation with the phase difference of said voltages.

9. Means for measuring the phase difference between two radio frequency voltages, comprising means for converting said phase difference to a low frequency voltage, the magnitude of one of the components of which depends upon the sine of said phase difference and the magnitude of another of which depends upon the cosine of said phase difference, a cathode ray oscillograph, means impressing one of said components upon one pair of the deflecting plates of said oscillograph, and means impressing said other of said components upon the remaining pair of said deflection plates.

10. Means for measuring the phase difference between two radio frequency voltages, comprising means modulating one of said voltages with a low frequency voltage, means superimposing said modulated voltage upon the other of said radio frequency voltages, a frequency selective amplifying means, a single control means for tuning said amplifying means, means impressing the result of said superimposed voltage on said amplifying means, means submitting the output of said amplifying means to both phase and amplitude detection, and means indicating the relative magnitude of the outputs of said detecting means as a measure of the magnitude of said phase difference.

11. Means for measuring the phase difference between two radio frequency voltages, comprising means modulating one of said voltages with a low frequency voltage, means superimposing said modulated voltage upon the other of said radio frequency voltages, means amplifying the resultant of said superimposed voltages, means submitting the output of said amplifying means to phase multiplication, means submitting the output of said phase multiplying means to phase detection, means submitting the output of said amplifying means to amplitude detection, and means indicating the relative magnitude of the outputs of said detecting means as a magnified indication of the magnitude of said phase difference.

12. Means for measuring the phase difference between two radio frequency voltages, comprising means modulating one of said voltages with a low frequency voltage, means superimposing said modulated voltage upon the other of said radio frequency voltages, a frequency selective amplifying means, a single control means for tuning said amplifying means, means impressing the result of said superimposed voltage on said amplifying means, means submitting the output of said amplifying means to phase multiplication, means submitting the output of said phase multiplying means to phase detection, means submitting the output of said amplifying means to amplitude detection, and means indicating the relative magnitude of the outputs of said detecting means as a magnified indication of the magnitude of said phase difference.

13. Means for measuring the phase difference between two radio frequency voltages, comprising means for converting said phase difference to a low frequency voltage, the magnitude of one of the components of which depends upon the sine of said phase difference and the magnitude of another of which depends upon the cosine of said phase difference, a cathode ray oscillograph, means impressing one of said components upon one pair of the deflecting plates of said oscillograph, means impressing said other of said components upon the remaining pair of said deflection plates, and means blocking the cathode ray beam of said oscillograph during half of each cycle of said components.

14. Means for measuring the phase difference between two radio frequency voltages, comprising means for converting said phase difference to a low frequency voltage, the magnitude of one of the components of which depends upon the sine of said phase difference and the magnitude of another of which depends upon the cosine of said phase difference, a cathode ray oscillograph, means impressing one of said components upon one pair of the deflecting plates of said oscillograph, means impressing said other of said components upon the remaining pair of said deflection plates, and trigger means controlled by said low frequency voltage and rendering said cathode ray oscillograph operative throughout only one half of each cycle of said low frequency voltage.

15. Means for measuring the phase difference between two radio frequency voltages, comprising means for converting said phase difference to a low frequency voltage, means separating said low frequency voltage into a pair of components, the magnitude of one of which depends upon the sine of said phase difference and the magnitude of the other of which depends upon the cosine of said phase difference, and means utilizing the relative magnitudes of said components as an indication of said phase difference.

16. Means for measuring the phase difference between two radio frequency voltages, comprising means for converting said phase difference to a low frequency voltage, means separating said low frequency voltage into a pair of components, the magnitude of one of which depends upon the sine of said phase difference and the magnitude of the other of which depends upon the cosine of said phase difference, an indicating means having a circular scale and means transforming the relative magnitudes of said components into a direct indication of said phase difference on said scale.

MAXWELL K. GOLDSTEIN.